No. 861,285. PATENTED JULY 30, 1907.
E. C. HORST & J. EHRHORN.
HOP PICKER.
APPLICATION FILED OCT. 17, 1906.
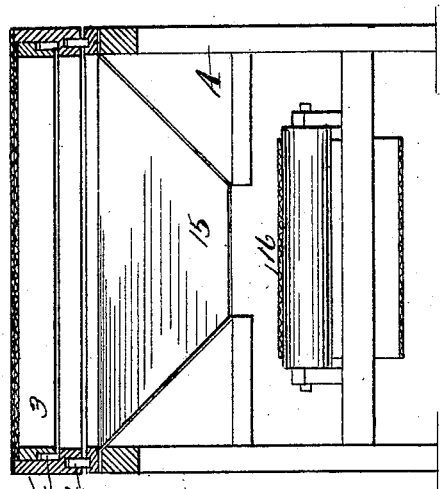
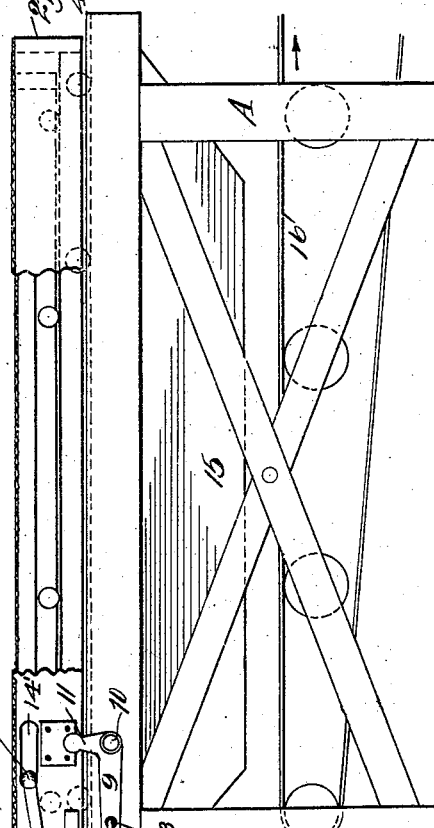
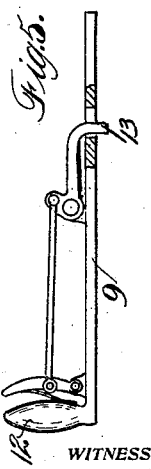
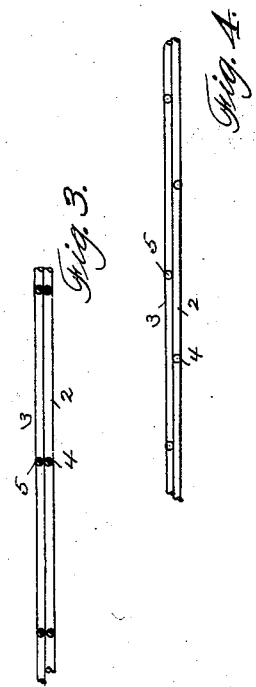
WITNESSES:
INVENTORS
Emil Clemens Horst
John Ehrhorn,
BY
Geo. H. Strong
ATTORNEY

UNITED STATES PATENT OFFICE.

EMIL CLEMENS HORST, OF SAN FRANCISCO, AND JOHN EHRHORN, OF PERKINS, CALIFORNIA, ASSIGNORS TO E. CLEMENS HORST CO., OF SAN FRANCISCO, CALIFORNIA, A CORPORATION OF NEW JERSEY.

HOP-PICKER.

No. 861,285.     Specification of Letters Patent.     Patented July 30, 1907.

Application filed October 17, 1906. Serial No. 339,377.

*To all whom it may concern:*

Be it known that we, EMIL CLEMENS HORST, of the city and county of San Francisco, State of California, a citizen of the United States, and JOHN EHRHORN, of Perkins, county of Sacramento, State of California, a citizen of Germany, have invented new and useful Improvements in Hop-Pickers, of which the following is a specification.

Our invention relates to an apparatus for the picking and separation of hops from the vines upon which they grow.

It consists in a combination of mechanism, and in details of construction which will be more fully explained by reference to the accompanying drawings, in which—

Figure 1 is a side elevation of our apparatus. Fig. 2 is a transverse section. Figs. 3 and 4 are detail views of the superposed registering screens. Fig. 5 is a plan view of the lever 9 and its adjuncts.

It is the object of our invention to provide an apparatus by which hops may be separated from the vines upon which they grow; the vines may be pulled from the ground with the hops still upon them, and these vines being thrown upon our apparatus, the hop berries can be separated from the vines by this apparatus.

The apparatus consists of a suitable support or framework, as at A, and upon this frame-work screen frames 2 and 3 are carried as follows: The frame 2 has rollers 4 journaled on its lower edges adapted to travel upon the longitudinal frame timbers A. The upper parts of the longitudinal screen frame 2 are cut away on the inside as shown, so as to receive the corresponding frames 3 of the second screen, and these frames are in like manner mounted upon rollers 5 which travel upon the shoulders of the cut-away portion of the frame 2; the object of this being to allow an independent movement of the screen frames, or movements in unison.

The tops of the frames 2 and 3 are covered with coarse screen material which is known as "chicken screen", and has a mesh sufficiently large to allow the hop berries to fall through, while carrying the vines upon the surface. These screens are normally locked together so that the meshes of the screens will substantially register, and when the vines are thrown upon these screens, a great portion of the flowers which are in the lower part of the mass, will fall through the openings in the screens, and hang dependent below the screens.

In order to hold the screens in register, I have shown an upturned yoke 6 projecting from the end of the frame 2 and a bail 7 connected with the inner screen 3 has its outer end adapted to drop into the notch 8 of the part 6, thus holding the two screen frames stationary with relation to each other, and the screens registering as above described. The screens may then be reciprocated upon the bearing rollers 4 of the outer screen, by means of a lever 9 fulcrumed to the frame A, as shown at 10, and having the short arm 11 adapted to engage a socket in the frame 2 so that by moving the handle 12 of this bell-crank lever, the two frames A and 2 may be reciprocated together. This reciprocation serves to shake the hop vines and hops, and to cause a large proportion of the hops to drop through the screen openings and hang suspended below. When a sufficient reciprocation of these parts has been effected, the lever 9 may be locked to the frame A by means of a pin as at 13, and thus prevent the reciprocation of the screen 2. By raising the bail 7 and disengaging it from the notch 8, it will be seen that the screen frame 3 may then be reciprocated by reason of the inturned ends 14 of the bail passing through slots 14′ in the frame 2, and connecting with the inner frame, and by reciprocating this frame it travels upon the outer frame 2, being carried by its rollers 5 as previously described. The reciprocation of this screen independently of the upper or outer screen, causes the meshes of the inner screen to move across the meshes of the outer screen in such a manner as to sever the stems of the hops from the vines in the manner of a cutter; thus allowing the hops to drop into the convergent hopper or receptacle 15 which is carried upon the frame A, and beneath the screens. The lower part of this hopper may be open, and beneath it may be mounted a conveyer 16 which receives the hops, and transfers them to some receptacle outside this portion of the machine.

Having thus described our invention, what we claim and desire to secure by Letters Patent is—

1. In a hop separator, the combination of two parallel screens substantially in sliding contact, means for locking the screens together with their openings in register whereby the stems of hops placed upon one screen will project through the openings of both screens, means coöperating with said locking means for releasing one screen from the other to allow the screens to be moved one relative to the other, to sever the hop stems, means connected with the screens for reciprocating them in unison or one relative to the other, and a fixed support for the screens.

2. In an apparatus for picking hops from the vines, screen frames located one within the other, with screens upon their upper surfaces in close proximity, rollers upon which the inner frame may be reciprocated upon the outer, and the outer upon a fixed support, means for locking the frames together, and reciprocating them in unison, and means for locking the outer frame and disengaging and reciprocating the inner frame.

3. In a hop picking apparatus, a fixed support, screen frames, one located within the other, said frames having registering openings for the reception of the stems of the hops, rollers upon which the inner frame may be reciprocated upon the outer and the outer upon said main support, locking lugs fixed to the outer frame, and a bail connected with the inner frame and engaging said lugs and a fulcrumed lever engaging the outer frame and adapted to reciprocate the two frames in unison.

4. In a hop picking apparatus, a stationary main frame, an exterior and an interior screen frame, with means for reciprocating said frames in unison or independently, screens fixed upon the upper edges of the frames and in close proximity, lugs carried upon the outer frame and a bail upon the inner frame adapted to engage said lugs whereby the screen meshes are caused to register, a lever fulcrumed to a fixed point engaging the outer frame so as to reciprocate the two frames in unison, locking pins by which said lever may be fixed, the bail connected with the inner screen frame being disengageable whereby the inner frame may be reciprocated independently of the outer frame.

5. In a hop picking apparatus, a stationary main frame, a plurality of frames having screens fixed upon their upper edges and in close proximity, bearings upon which their frames are movable independently or in unison, means by which the screens may first be locked together and reciprocated with the screen, meshes registering with each other, means by which the outer screen frame may be locked, the inner screen frame disengaged and reciprocated independently, a hopper located below the screens to receive the severed hops and a conveyer upon which said hopper discharges.

In testimony whereof we have hereunto set our hands in presence of two subscribing witnesses.

EMIL CLEMENS HORST.
JOHN EHRHORN.

Witnesses:
E. P. CHRISTIE,
ERNST LANGE.